United States Patent Office 3,266,906
Patented August 16, 1966

3,266,906
ALGIN GEL AND GELATIN COMPOSITION HAVING HIGH BLOOM STRENGTH AND PROCESS
Aaron Miller, La Jolla, and James K. Rocks, San Diego, Calif., assignors to Kelco Company, San Diego, Calif., a corporation of Delaware
No Drawing. Filed Dec. 13, 1962, Ser. No. 244,269
13 Claims. (Cl. 99—131)

This invention relates to aqueous gelatinous products produced from water soluble alginates by the interaction of said alginates with certain salts particularly salts of calcium, the said products having high or improved bloom gel strength.

It is an object of this invention to provide new aqueous alginate gel compositions and methods of producing said compositions.

The invention is suitable for use in producing a wide variety of edible products such as dessert gels, fruit jams and jellies, jellied salads and broths, and candy jellies. Inedible jellies may also be made for industrial purposes such as gels for dental impressions, deodorants, insecticides, and the like.

The instant invention is particularly suitable for producing aqueous dessert gels by incorporating the compositions of our invention with a hot aqueous liquid such as hot water.

It is a further object of this invention to produce smooth, firm yet tender aqueous dessert gels.

It is a further object of this invention to produce alginate compositions suitable for producing aqueous dessert gels meeting institutional standards as to gel strength.

It is well known that water soluble alginates react with soluble calcium salts to form insoluble calcium alginate gels. The patent literature discloses the product of such gels with various algin compositions. Thus, for example, the Arnold B. Steiner Patent U.S. 2,441,729 discloses the manufacture of such gels from water soluble algin, calcium salts, a weak acid such as acetic or citric, and a gel retarding salt such as sodium hexametaphosphate. Further algin gel compositions are disclosed in the Kenneth F. Gibsen Patent U.S. 2,918,375, issued December 22, 1959. This patent discloses gel compositions similar to the compositions disclosed in the Steiner patent and it is directed to an improvement over the said Steiner patent in which adipic or fumaric acid is employed as the acid ingredient.

In general the known method of producing an algin gel as disclosed in the literature as exemplified by the aforementioned Steiner and Gibsen patents is to employ a water soluble alginate as a source of algin and a calcium salt as the source of the calcium required to gelatinize the algin by converting it into an insoluble calcium alginate gel. On the addition of the free acid to a mixture of sodium alginate and a calcium salt, the calcium salt is slowly ionized to yield calcium ions, these free ions then reacting with the soluble alginate to form insoluble calcium alginate. As the calcium ions are removed from solution in this manner, more are liberated and thus gelation proceeds through the gradual ionization of the calcium salt and the rate of gelation will be governed at the rate by which this ionization takes place. This in turn is governed by the inherent ionizability of the calcium salt, on the strength and concentration of the acid used, on the temperature obtained, and on the nature and amount of the gel retarding salt such as the aforementioned sodium hexametaphosphate. As the temperature is ordinarily fixed by the nature of the final product to be made, i.e. household dessert gels made with hot water, the speed of gelation as a practical matter is controlled by the selection of the calcium salt and acid and by the use of a gel retarding salt which is ordinarily and usually required depending on the nature of the acid or substance used to liberate the calcium ions.

In marketing compositions made as aforesaid it is customary for the purchasers thereof, particularly when such gel compositions are both for institutional use such as the Government, hospitals, and the like, to test the compositions for gel strength. The algin gel compositions of which we have knowledge that have been made as aforesaid have a relatively low bloom gel strength in comparison with other materials used for making dessert gels. The term bloom gel strength is used to mean herein a gel strength as measured on a Bloom Gelometer. This instrument and method are well known by those concerned with the art of testing dessert gel compositions. The bloom instrument and method of use will be described in some detail later herein.

In accordance with our invention we have surprisingly found that we may increase the bloom gel strength of an aqueous calcium alginate gel as much as 50% by the addition of as little as 0.02 gm. of gelatin to the ingredients used in making the algin gel.

For convenience in utilizing our invention further information is set forth below as to our method and the ingredients employed.

(1) A water-soluble algin. This may be the alginate of ammonium, magnesium, potassium, sodium or other alkali metal, or the alginate of an organic base such as mono-, di- or tri-ethanolamine, aniline, etc. These soluble algins may be prepared by well known methods such as disclosed in the following United States patents: 1,814,981, Thornley and Walsh, July 14, 1931; 2,036,922, Clark and Green, April 7, 1936; 2,036,934, Green, April 7, 1936; and 2,128,551, Le Gloahec, August 30, 1938.

The viscosity of the algin is not critical, though the higher viscosity algins form stronger gels than those of lower viscosity. As the compositions are usually prepared in the dry form, the algin is comminuted. The favorable grain size depends on the usage of the composition. An especially preferred water soluble alginate for our purpose is a commercial grade of fibrous sodium alginate sold by the Kelco Company, San Diego, California. The best gels for clarity and smoothness are obtained if the calcium ash of the sodium alginate is low, i.e., about 0.5% or less expressed as calcium oxide ash.

(2) A salt, preferably of calcium, which either is insoluble or very slightly soluble in water, or which in aqueous solution is only slightly ionized, or both, and which on the addition of an acid yields cations which gelatinize alginates. This might otherwise be defined as an algin-gelatinizing salt having a low solubility product. In still other words, the salt in an aqueous medium must not yield any material number of the cations which gelatinize the alginic component until the acid reacts with the salt.

Examples are tricalcium phosphate, dicalcium phosphate, calcium carbonate, and calcium tartrate. Salts of the other alkali-earth metals (with the exception of magnesium, which forms water-soluble alginates) may be substituted for the calcium salts. Many of the heavy metals may be substituted for calcium salts. Many of the heavy metals may be substituted for calcium, but not as a rule in edible compositions as most of these metals are more or less toxic.

In producing aqueous dessert gels, we have found that calcium carbonate, dicalcium phosphate and tricalcium phosphate are particularly suitable sources of cations for said purpose.

It will be understood that in the above remarks the reference to calcium salts is intended to be illustrative only. The same principles apply in the use of the corresponding salts of the other alkali-earth metals and of the heavy metals.

The term "a salt whose cations . . . are no more than slightly liberated in water" is intended to cover the type of salt above described, having a low solubility product. The desired effect of restricting the presence of free calcium or similar cations to the lowest possible terms may be realized through low solubility, or low ionizability, or more often through both of these characteristics. It is conceivable, however, that a substance might be completely ionized in water and yet furnish only a negligible number of cations, due to its extremely low solubility. On the other hand, a much more soluble substance might yield the same negligible number of cations by reason of its low inherent ionizability. It is preferred to use a substance for this purpose which has a solubility product not higher than $10^{-4}$ at 25° C. In most cases it will be desirable to use less than the stoichiometric equivalent of calcium or other gel-forming salt. The use of such quantities of the said salts tends to produce clearer gels.

(3) In addition to the ingredients mentioned in (1) and (2) in the foregoing, we also employ a gel-inhibiting or gel-retarding salt. This component may be one of the alkali metal salts of such acids as citric and the various phosphoric acids. These tend to inhibit gel formation by reason of their buffer action, and alkalinity, their common ion effect or combination of these effects. In general, these inhibitors are salts of weak acids. Particularly suitable materials for this purpose are sodium tripolyphosphate and sodium hexametaphosphate. The amount of retarder to be used will vary depending not only on the algin and the acid, i.e. citric, fumaric or adipic, employed but also on the nature of the aqueous medium.

(4) In the production of aqueous gels, in addition to the alginates as described in (1) above, the calcium salts described in (2) above, and the gel retarder described in (3), a weakly acidic substance is also required, thus, for example, tartaric, citric, glutaric, gluconic, lactic, succinic, acetic, fumaric, or adipic acids, or substances which yield free acid on solution in water such as D-glucono lactone.

(5) The gelatin that we use in our composition to produce a high bloom strength algin gel composition is gelatin that is sold commercially and is used for many purposes including the manufacture of dessert gels per se.

On the solution of the acid or acidic substance the calcium salt is ionized to yield calcium ions, these free ions immediately reacting with the soluble alginates to form the insoluble calcium alginate gel. The presence in the said solution of a very small quantity of dissolved gelatin as aforementioned results in an algin gel composition having a high bloom strength.

In keeping with our invention it is our purpose to produce a combination of ingredients that can be added in one step to hot water to produce a gel with high gel strength. Thus, we prefer to pre-mix all of the ingredients, i.e. the water soluble alginate, the salt used as a source of cations, thus, for example, calcium, the retarder such as sodium tripolyphosphate, the acid such as citric, fumaric, or adipic, and the gelatin. The said components making up our composition render themselves suitable for blending and prepackaging prior to use. It will be understood, however, that if it should be desired the ingredients could be added separately to a hot aqueous liquid to produce a gel therefrom. The ingredients of our invention will produce a gel without refrigeration. As one example of our invention we prepared a mixture comprising 2½ gm. of a fibrous commercial sodium alginate; .32 gm. of calcium carbonate, .15 gm. of sodium tripolyphosphate, 2.75 gm. of adipic acid, .1 gm. of gelatin, and 77.725 gm. of sugar. A gel was prepared from the aforementioned mix by adding it to two cups of water brought to a boil. The Bloom Gelometer reading on this gel taken after standing for two hours at room temperature was 51.5 gm. However, the Bloom Gelometer reading on an identical admixture without any gelatin in the formula was only 32 gm. We repeated the foregoing experiment using many other calcium algin gel compositions both with and without the addition of gelatin and found that some of said compositions could be improved in bloom gel strength as much as 50% when the formula included as little as 0.02 gm. of gelatin.

The Bloom Gelometer is an instrument that is available commercially from the Precision Scientific Company, 3737 West Cortland Street, Chicago 47, Illinois. It was developed by Dr. Oscar Bloom of Swift & Company and is used to determine the gel strength of food products such as gelatin desserts and starch dessert powders. The instrument is used by governments and institutions in testing not only gelatin desserts but other type gel desserts as well. In general, the instrument is a device that contains a plunger that is lowered a predetermined distance, usually 4 mm., into the sample. Force applied to the plunger to drive it against the resistance of the gel or jelly is a direct measure of the gel strength or jelly strength of the material tested. The result is reported in grams.

In the foregoing, we have referred to gelatin as a product that is available commercially. Gelatin may be further defined as a product obtained by selective hydrolysis of collagen, the major intercellular protein constituent of the white connective tissue of animal skins and bones. Gelatin consists of a mixture of soluble proteins of high average molecular weight that is capable of forming a firm gel in an aqueous medium, and which on digestion yields various amino acids in definite ratios.

The amounts of ingredients used in preparing aqueous calcium alginate gels are described in the literature. However, for convenience, it should be noted that the water soluble salt of alginic acid or water soluble alginate is used in a range from about 1.5 to 5.0 parts by weight of the aqueous medium or water employed. The calcium salt, thus, for example, calcium carbonate, is used in a range from about 0.2 to 0.6 part by weight of the said aqueous medium or water. The alkali metal salt of a weak acid, thus, for example, sodium tripolyphosphate, is used in a range of from about 0.5 to 3.0 parts by weight of the said aqueous medium and the weakly acidic substance such as citric, fumaric, or adipic is used in an amount of from about 0.25 to 4.0 parts by weight of the said aqueous medium. In formulations embodying the aforementioned quantities of ingredients we have found that a small amount of gelatin in the range of from 0.02 to 1.0 part by weight of the aqueous medium or water will give a surprisingly large increase in bloom gel strength to a calcium alginate gel in accordance with our invention.

It will be appreciated that the description herein is illustrative of our invention and many variations can be made in accordance therewith and as claimed in the appended claims.

What we claim is:

1. A composition suitable for producing a high bloom strength alginate gel by incorporation with an aqueous medium comprising a water soluble alginate, a salt whose cations form a water insoluble salt with alginic acid and which has a solubility product not substantially exceeding $10^{-4}$ at 25° C., a water soluble alkali metal salt of a weak acid, a weakly acidic substance selected from the group consisting of tartaric acid, citric acid, glutaric acid, gluconic acid, lactic acid, succinic acid, acetic acid, fumaric acid, adipic acid, and D-glucono lactone, and an amount of gelatin dissolved in said aqueous medium in excess of .4% of the weight of the said alginate in said composition, said amount being sufficient to raise the bloom gel strength of an aqueous gel produced from said composition in excess of the bloom gel strength of an alginate gel produced from a like composition not including said gelatin.

2. A product suitable for producing a high bloom strength aqueous dessert gel comprising a water soluble alginate, a salt whose cations form a water insoluble salt with alginic acid, an alkali metal salt of a weak acid, citric acid, and an amount of gelatin dissolved in said aqueous medium in excess of .4% of the weight of the said alginate in said composition, said amount being sufficient to raise the bloom gel strength of an aqueous gel produced from said composition in excess of the bloom gel strength of an alginate gel produced from a like composition not including said gelatin.

3. A product suitable for producing a high bloom strength aqueous dessert gel comprising a water soluble alginate, a salt whose cations form a water insoluble salt with alginic acid, an alkali metal salt of a weak acid, fumaric acid, and an amount of gelatin dissolved in said aqueous medium in excess of .4% of the weight of the said alginate in said composition, said amount being sufficient to raise the bloom gel strength of an aqueous gel produced from said composition in excess of the bloom gel strength of an alginate gel produced from a like composition not including said gelatin.

4. A product suitable for producing a high bloom strength aqueous dessert gel comprising a water soluble alginate, a salt whose cations form a water insoluble salt with alginic acid, an alkali metal salt of a weak acid, adipic acid, and an amount of gelatin dissolved in said aqueous medium in excess of .4% of the weight of the said alginate in said composition, said amount being sufficient to raise the bloom gel strength of an aqueous gel produced from said composition in excess of the bloom gel strength of an alginate gel produced from a like composition not including said gelatin.

5. A product suitable for producing aqueous acidic gels from an aqueous medium containing calcium and phosphate ions comprising a water soluble alginate, fumaric acid, and an amount of gelatin dissolved in said aqueous medium in excess of .4% of the weight of the said alginate in said composition, said amount being sufficient to raise the bloom gel strength of an aqueous gel produced from said composition in excess of the bloom gel strength of an alginate gel produced from a like composition not including said gelatin.

6. A product suitable for producing aqueous acidic gels from an aqueous medium containing calcium and phosphate ions comprising a water soluble alginate, adipic acid, and an amount of gelatin dissolved in said aqueous medium in excess of .4% of the weight of the said alginate in said composition, said amount being sufficient to raise the bloom gel strength of an aqueous gel produced from said composition in excess of the bloom gel strength of an alginate gel produced from a like composition not including said gelatin.

7. A product suitable for producing aqueous acidic gels from an aqueous medium containing calcium and phosphate ions comprising a water soluble alginate, citric acid, and an amount of gelatin dissolved in said aqueous medium in excess of .4% of the weight of the said alginate in said composition, said amount being sufficient to raise the bloom gel strength of an aqueous gel produced from said composition in excess of the bloom gel strength of an alginate gel produced from a like composition not including said gelatin.

8. The method of gelatinizing a hot aqueous liquid which comprises introducing into said liquid a water soluble alginate, a salt whose cations form a water insoluble salt with alginic acid and which has a solubility product not substantially exceeding $10^{-4}$ at 25° C., a water soluble alkali metal salt of a weak acid, a weakly acidic substance selected from the group consisting of tartaric acid, citric acid, glutaric acid, gluconic acid, lactic acid, succinic acid, acetic acid, fumaric acid, adipic acid, and D-glucono lactone, and an amount of gelatin dissolved in said aqueous medium in excess of .4% of the weight of the said alginate in said composition, said amount being sufficient to raise the bloom gel strength of an aqueous gel produced from said composition in excess of the bloom gel strength of an alginate gel produced from a like composition not including said gelatin.

9. The method of gelatinizing an aqueous liquid which comprises introducing into said liquid a water soluble alginate, a salt whose cations form a water insoluble salt with alginic acid, an alkali metal salt of a weak acid, citric acid, and an amount of gelatin dissolved in said aqueous medium in excess of .4% of the weight of the said alginate in said composition, said amount being sufficient to raise the bloom gel strength of an aqueous gel produced from said composition in excess of the bloom gel strength of an alginate gel produced from a like composition not including said gelatin.

10. The method of gelatinizing an aqueous liquid which comprises introducing into said liquid a water soluble alginate, a salt whose cations form a water insoluble salt with alginic acid, an alkali metal salt of a weak acid, fumaric acid, and an amount of gelatin dissolved in said aqueous medium in excess of .4% of the weight of the said alginate in said composition, said amount being sufficient to raise the bloom gel strength of an aqueous gel produced from said composition in excess of the bloom gel strength of an alginate gel produced from a like composition not including said gelatin.

11. The method of gelatinizing an aqueous liquid which comprises introducing into said liquid a water soluble alginate, a salt whose cations form a water insoluble salt with alginic acid, an alkali metal salt of a weak acid, adipic acid, and an amount of gelatin dissolved in said aqueous medium in excess of .4% of the weight of the said alginate in said composition, said amount being sufficient to raise the bloom gel strength of an aqueous gel produced from said composition in excess of the bloom gel strength of an alginate gel produced from a like composition not including said gelatin.

12. A composition suitable for producing a high bloom strength alginate gel by admixture with a hot aqueous medium comprising a water soluble alginate in an amount from about 1.5 to 5.0 parts by weight of the aqueous medium, a salt whose cations form a water insoluble salt with alginic acid in an amount from about 0.2 to 0.6 part by weight of the said aqueous medium, an alkali metal salt of a weak acid in an amount of from about 0.5 to 3.0 parts by weight of said aqueous medium, a weakly acidic substance selected from the group consisting of tartaric acid, citric acid, glutaric acid, gluconic acid, lactic acid, succinic acid, acetic acid, fumaric acid, adipic acid, and D-glucono lactone, in an amount from about 0.25 to 4.0 parts by weight of said medium, and gelatin dissolved in said aqueous medium in the range of from about 0.02 to 1.0 part by weight of the said aqueous medium.

13. A new and useful composition suitable for producing a high bloom strength alginate gel by admixture with one pint of a hot aqueous liquid comprising:

| | Grams |
|---|---|
| sugar | 77.75 |
| sodium alginate | 2.5 |
| calcium carbonate | .32 |
| sodium tripolyphosphate | .15 |
| adipic acid | 2.75 |
| gelatin | .1 |

(References on following page)

References Cited by the Examiner

UNITED STATES PATENTS

| | | | |
|---|---|---|---|
| 2,441,729 | 5/1948 | Steiner | 99—131 |
| 2,846,314 | 8/1958 | Aichele et al. | 99—130 X |
| 2,918,375 | 12/1959 | Gibsen | 99—131 |
| 2,987,400 | 6/1961 | Hunter | 99—131 X |
| 2,992,925 | 7/1961 | Green et al. | 99—131 |

A. LOUIS MONACELL, *Primary Examiner.*

WILLIAM B. KNIGHT, *Examiner.*

J. M. GOLIAN, *Assistant Examiner.*